United States Patent [19]
Elvin

[11] 4,104,537
[45] Aug. 1, 1978

[54] STATIC CONVERTER EQUIPMENT
[75] Inventor: Sten Elvin, Vesteras, Sweden
[73] Assignee: ASEA AB, Vesteras, Sweden
[21] Appl. No.: 751,563
[22] Filed: Dec. 17, 1976
[30] Foreign Application Priority Data
Dec. 29, 1975 [SE] Sweden ............................. 7514669
[51] Int. Cl.² ............................................. H02J 1/10
[52] U.S. Cl. ...................................... 307/58; 307/29; 307/31; 307/32; 307/105
[58] Field of Search ...................... 307/29, 31, 32, 52, 307/53, 58, 82, 105; 318/98, 99; 321/65, 71

[56] References Cited
U.S. PATENT DOCUMENTS

| | | | |
|---|---|---|---|
| 3,792,286 | 2/1974 | Meier | 307/82 |
| 3,876,923 | 4/1975 | Humphrey et al. | 363/71 |
| 3,979,662 | 9/1976 | Klein | 363/71 |

FOREIGN PATENT DOCUMENTS 2,250,257  5/1973  Fed. Rep. of Germany ............. 318/98

Primary Examiner—Robert K. Schaefer
Assistant Examiner—Eugene S. Indyk
Attorney, Agent, or Firm—Pollock, Vande Sande & Priddy

[57] ABSTRACT

A static converter equipment comprising at least two converters, each with a DC terminal; each converter having a load with a feeding point connected to the DC terminal of the converter, the converters being arranged to work in offset phase relation to each other. The feeding points are interconnected with impedance means with resistance of at least the same order of magnitude as the load resistance and an impedance at the most of the same order of magnitude as the load impedance.

9 Claims, 5 Drawing Figures

STATIC CONVERTER EQUIPMENT

BACKGROUND

Two loads can be supplied from separate converters which are arranged to work in offset phase relation to each other. The phase displacement reduces the alternating component in the current drawn from the source. However, a strong alternating component occurs in the load current of each motor, and in order to avoid commutating and other drawbacks, this component must be held down by giving the load circuit a high inductance, for example, by smoothing inductors connected in series with the load. These inductors, which in practice it has been found, must often be of large dimensions resulting in considerable disadvantages.

It is further known to connect, in parallel, several loads, for example vehicle motors, with each other so that they form one single load. This load is connected to the mutually parallel-connected phase-displaced converters. With this connection, the phase displacement between the converters achieves a substantial reduction of the alternating component in the load current compared with the connection mentioned in the introduction at the same size of the smoothing inductors, that is, it will be possible in practice to work with considerably smaller smoothing inductors. In many different types of loads, for example, separately excited vehicle motors, this connection will lead to an uncontrolled and unacceptably uneven division of current between the loads, and in practice it will be necessary to arrange complicated regulating systems to achieve a uniform distribution of the load current between the loads.

SUMMARY OF THE INVENTION

The present invention aims to provide converter equipment of the kind mentioned in the introduction to this specification, in which neither high inductance values of the smoothing inductors, nor special regulating systems for obtaining a distribution of the current between the loads are needed. The feeding points of the loads are connected to the outputs of the associated converter and they are interconnected by impedance means selected in resistance and impedance to give good load current division with substantial reduction in the alternating component of the load current.

BRIEF DESCRIPTION OF THE DRAWINGS

The invention will be described in greater detail with reference to the accompanying FIGS. 1–4.

DETAILED DESCRIPTION

Figure 1:
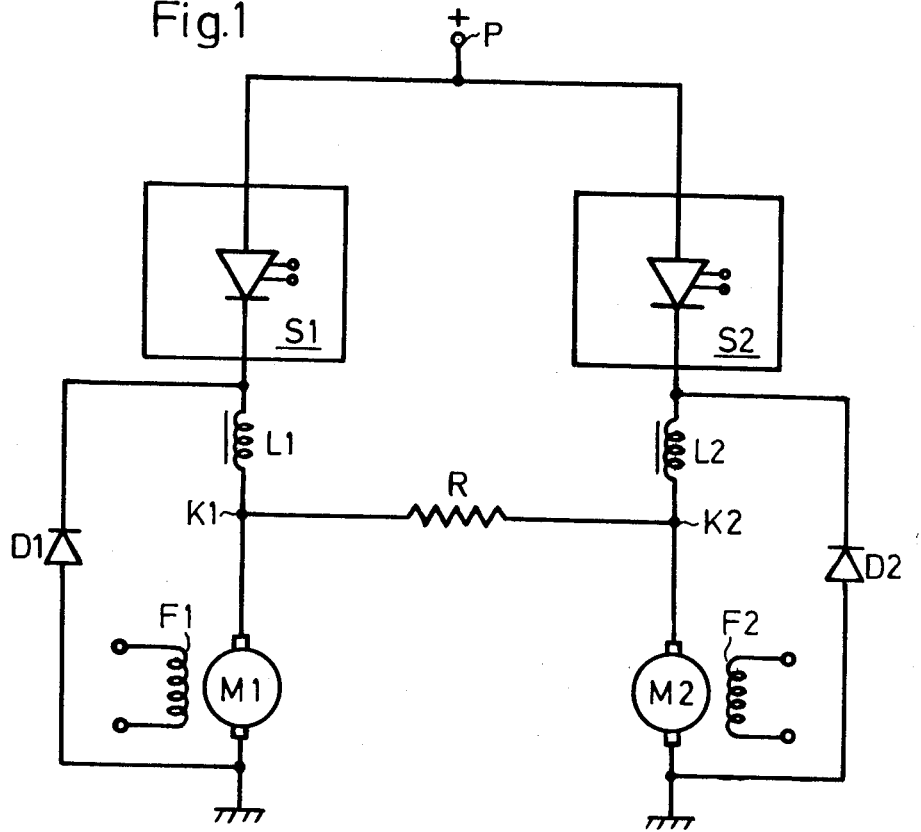
FIG. 1 shows an equipment in a vehicle in which two DC converters are supplying two drive motors.

FIG. 1 shows a converter equipment for controlling two drive motors M1 and M2. The equipment has a terminal P for connection to a positive direct voltage source which may consist of a contact line or an accumulator battery. The two DC converters S1 and S2, of conventional type, emit direct voltage pulses, the average value of the output voltage can be controlled by controlling the frequency and/or duration of the pulses. Smoothing inductors L1 and L2 are connected in series with the converters. Each motor constitutes a load with a feeding point, K1 and K2, respectively. The two points K1 and K2 are connected to each other by way of an impedance element, consisting of resistor R. A DC converter S1, S2 is connected to each feeding point K1, K2. The motors are separately excited, that is, their field windings F1 and F2 are supplied from separate current sources, or from a common current source. Each motor-smoothing inductor is provided with a free-wheeling diode, D1 and D2, respectively.

The DC converters S1, and S2, are controlled in phase opposition with respect to each other in a known manner. If resistor R has low resistance, the AC fundamental tones, which are offset in phase by 180°, will, to a large extent, cancel each other resulting in a low harmonic content in the motor currents. If resistor R has relatively high resistance, with DC converter will substantially affect only the direct current through the associated motor and only to a minor extent affect the direct current of the other motor. A uniform distribution of the load current can therefore be obtained with the help of the control system of the DC converters.

Figure 2A:
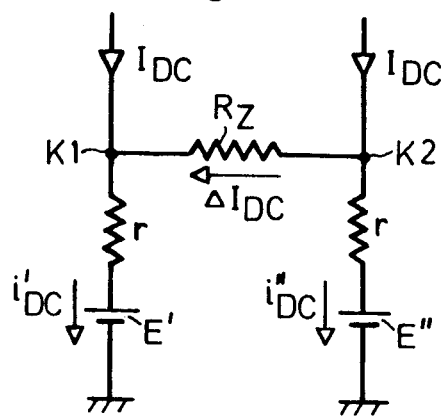
FIGS. 2A and 2B show equivalent DC and AC diagrams, respectively, for the connection of FIG. 1.

FIG. 2A shows the DC equivalent diagram for equipment according to FIG. 1 in which, instead of the resistor R, an arbitrary impedance Z connects the feeding points of the motors. The DC converters are regarded as DC source each one feeding the direct current $I_{DC}$ into the feeding points K1, K2. The resistance of the impedance Z is designated $R_Z$. Each motor consists of an e.m.f. $E'$ and $E''$, respectively, in series with the armature resistance $r$ of the motor. The motor currents are designated $i'_{DC}$ and $i''_{DC}$ and the current flowing through Z is designated $\Delta I_{DC}$. The e.m.fs. of the motors are assumed to differ from each other by the amount $\Delta E$, which, for example, may be due to differences within the motors, in their field currents or in the motor speeds. The following equations apply:

$$E'' - E' = \Delta E$$

$$\Delta E/(R_Z + 2r) = \Delta I_{DC}$$

$$i'_{DC} = I_{DC} + \Delta I_{DC}$$

$$i''_{DC} = I_{DC} - \Delta I_{DC}$$

Consideration should be given, when dimensioning the impedance element Z, to possible armature reaction resulting in higher unbalance in motor operation (drive connection) than in generator operation (brake connection).

Figure 2B:
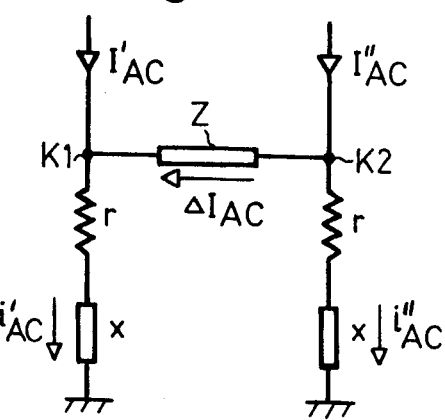

FIG. 2B shows the AC equivalent diagram of the equipment of FIG. 1. The DC converters feed the alternating currents $I'_{AC}$ and $I''_{AC}$; $\Delta I_{AC}$ flows through the impedance Z and $i'_{AC}$ and $i''_{AC}$ flow through the motors. Each motor has the resistance $r$ and the reactance $x$. Since the converters are in phase opposition by 180°, this also applies to their AC fundamental tones, so $I'_{AC} = -I''_{AC} = I_{AC}$. The following then applies:

$$i'_{AC} = Z/(Z + 2r + 2jx) \cdot I_{AC}$$

$$i'_{AC} = -i''_{AC}$$

It has been assumed here that the converters appear as constant current sources ($I'_{AC}$ and $I''_{AC}$), which approximates actual conditions.

From the above equations it is clear that $R_Z$, in order to achieve a significant improvement of the load division, should be of at least the same order of magnitude as the motor resistance $r$. It is also clear that to achieve a significant reduction of the AC component of the motor current, the impedance Z should not be higher about the same order of magnitude as the motor impedance $r + jx$. The expression "A should be at least or at the most of the same order of magnitude as B" means, for the purpose of this application that A should be at least approximately 0.1–0.3 B, and at the most 3–10 B.

Typical parameters for FIG. 1 are:

| | | |
|---|---|---|
| r | = 0.1 ohm | |
| L | = $10^{-3}$ H | (L = the motor inductance) |
| $I_{DC}$ | = 300 A | |
| $I_{AC}$ | = 100 A | |
| f | = 200 Hz | (f = the converter pulse frequency) |
| ΔE | = 30 V | | which results in the motor reactance $x = 1.25$ ohm.

The first of the initially mentioned known connections (each converter feeding its own motor) corresponds to $R_Z = Z = \infty$ in the above equations, resulting in the following:

$$\Delta I_{DC} = 0, \text{ i.e. } i'_{DC} = i''_{DC} = 300 \text{ A } i'_{AC} = i''_{AC} = 100 \text{ A}$$

This represents good load division, but a strong AC component is also present.

The second of the two known cases (the parallel-connected motors being fed by the parallel-connected converters) corresponds to $R_Z = Z = 0$ results in the following:

$$\Delta I_{DC} = 150 \text{ A}$$

$$i'_{DC} = 450 \text{ A}$$

$$i''_{DC} = 150 \text{ A}$$

$$i'_{AC} = i''_{AC} = 0$$

The load division is very bad.

According to the invention the resistor R is provided, as shown in FIG. 1. Its resistance preferably is, at the most, of the order of magnitude of 1.25 ohm and at least of the order of magnitude of 0.1 ohm. If, for example, the resistance is chosen to be 0.8Ω, the following is obtained:

$$\Delta I_{DC} = 30 \text{ A}$$

$$i'_{DC} = 330 \text{ A}$$

$$i''_{DC} = 270 \text{ A}$$

$$i'_{AC} = i''_{AC} = 30 \text{ A}$$

that is, good load division and a low AC component are obtained simultaneously in the motor current. It has been found in practice that it is often possible to find a value of resistance such that requirements for good load division and low AC components are obtained simultaneously in a simple manner, which was not possible in previously known systems without considerable disadvantages (large smoothing inductors, complicated current regulating systems). As illustrated by the above typical values, the rated power of the resistor is low. The cost of the resistor will therefore be negligible and its dimensions small.

In some cases the impedance element which connects the feeding points of the load may consist of a capacitor bank. Since the resistance of this is, in principle, infinite, perfect load division is obtained. To obtain reasonable dimensions of the capacitor bank and avoid resonance between it and the load inductances, it is suitable, as a rule, to use a capacitor bank only in such equipment where the frequency of the AC components is always relatively high. In the case shown in FIG. 1 with an electric vehicle operated by a DC converter, a resistor is probably more suitable than a capacitor bank.

In equipment with parallel-connected, separately excited DC motors, it has hitherto been necessary, to attain good load division, to provide a regulating system which controls the motor current by controlling field currents. This requires separate controllable current sources for the field windings of the motors. Since, according to the invention (see FIG. 1), good load division can be obtained in separately excited motors without such regulating systems, one single, possibly uncontrolled current source can be arranged for all the field windings, which is a considerable simplification and saving.

In the above examples of converters there have been shown self-commutated DC converters, but the invention is, of course, also applicable to equipment with other types of converters, for example network-commutated controlled or uncontrolled converters for the supply of, for example, DC motors. This type of converter can be connected to the supplying AC network by way of transformers with different phase angles, whereby they will work in phase-shifted relation to each other. For example, two six-pulse bridges may be arranged to be offset in phase by 30° (360°/2p, where p is the pulse number).

Each converter may, of course, consist of two or more series-connected, parallel-connected or series-parallel connected partial converters. Similarly, each load may consist of two or more series-connected, parallel-connected or series-parallel connected partial loads (e.g., according to FIG. 3). In the above examples, DC motors have been used as loads, but other types of loads are possible.

In the illustrated examples the equipment has two phases, that is, it comprises two phase-shifted converters. However, the invention is also applicable to multiphase equipment, that is, equipment with three or more mutually phase-shifted converters, each with its own load. If, for example, the number of phases is three, the three converters preferably work with a mutual phase displacement of 120°. The feeding points of the three loads can then be connected, for example, through star- or delta-connected resistances.

Figure 3:
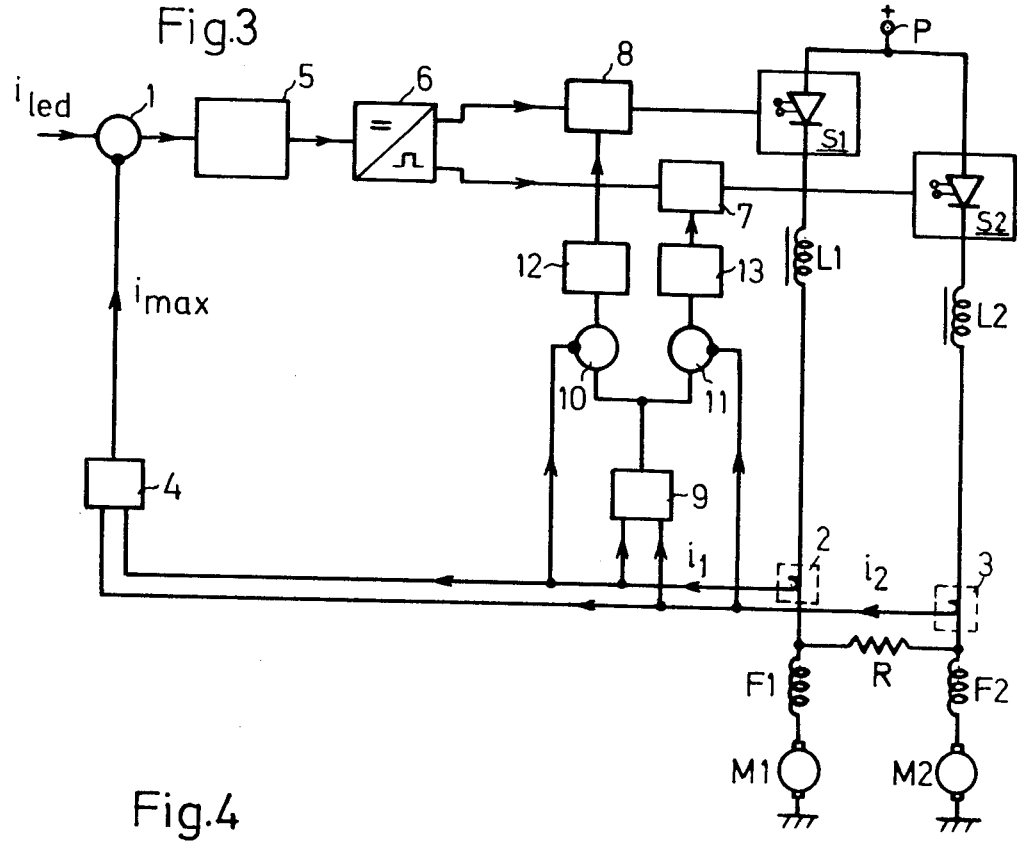
FIG. 3 shows an example of a possible design of the current regulating system in equipment according to FIG. 1.

FIG. 3 shows an example of how the control and regulating system for the equipment according to FIG. 1 can be constructed. The current measurement devices 2 and 3 form signals $i_1$ and $i_2$ which correspond to the direct currents through the two converters. In a maximum value detector 4 the value $i_{max}$ is formed, which is the greater of $i_1$ and $i_2$. The detector 4 uses conventional analog circuit techniques. If both $i_1$ and $i_2$ are positive signals the detector 4 could couple them to a common output through forwardly biased diodes. A comparator 1 compares $i_{max}$ with a current reference value $i_{led}$. The difference (the current error) is supplied to a current regulator 5 whose output signal controls the control pulse device 6. This emits ignition and extinction pulses to the converters so that such a pulse frequency and pulse width are obtained in the converters that $i_{max}$ is controlled toward $i_{led}$. The converters are controlled in 180° phase opposition, that is, alternate ignition pulses from the control pulse device 6 are delivered to S1 and S2.

The units 7 - 13 constitute a system which provides a good division of the load between the converters. The minimum value detector 9 provides a signal analogous to a quantity $i_{min} + \Delta$, wherewhere $i_{min}$ is the smaller of $i_1$ and $i_2$ and $\Delta$ is a small constant amount. In the comparison means 10 and 11 the quantity $i_{min} + \Delta$ is compared with $i_1$ and $i_2$, respectively. The differences are supplied to load division regulators 12 and 13, the output signals of which influence the delay means 7 and 8. If, for example, $i_1$ tends to exceed $i_{min} + \Delta$, the load division regulator will influence the delay means 8 which then reduces the pulse width of the converter S1. In this way the difference between the converter current will never be greater than $\Delta$. The detector 9 is, similar to detector 4, also a conventional analog circuit. Regulators 5, 12 and 13 are amplifiers with R-C feedback to give proportional-integrating characteristics. The control pulse device 6 may be a unijunction relaxation oscillator, such as that disclosed in the G.E. SCR manual, FIG. 4.16 (2d ed 1961). The delay means 7,8 can comprise monostable multivibrators with a normally constant unstable state which, however, can be reduced in response to control signals from the respective regulator 12 or 13.

Figure 4:
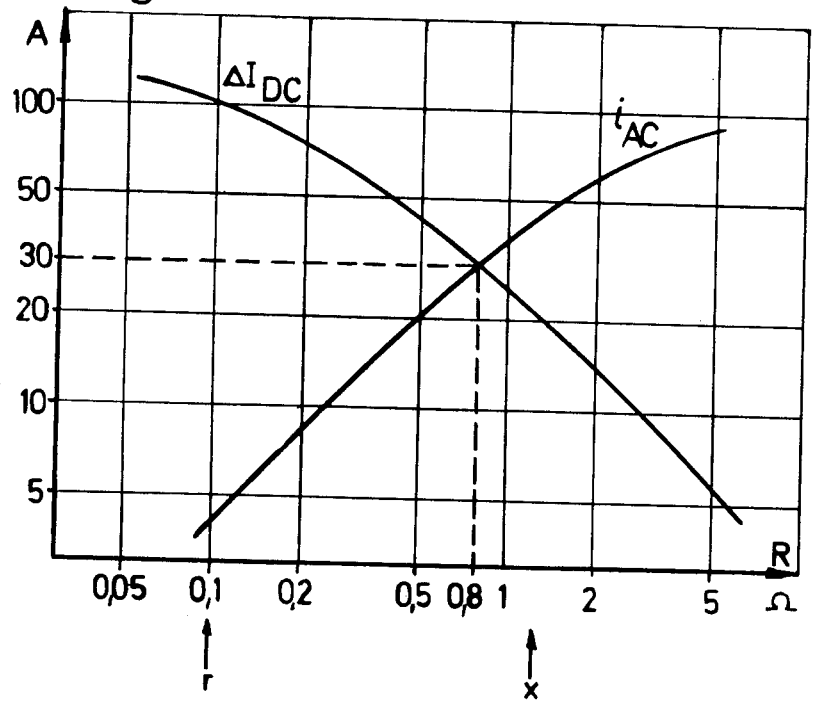
FIG. 4 shows the load division and the AC component as functions of the dimensioning of the impedance element according to the invention.

FIG. 4 shows the load division and the AC component in the motor current as functions of the resistance of the resistor R in FIGS. 1 and 2. The designations refer to FIG. 2, and the curves show $\Delta I_{DC}$ and $i_{AC}$ for the numerical example described in connection with FIG. 2. As will be seen, $\Delta I_{DC}$ decreases with increasing R (the load division is improved) and the AC component $i_{AC}$ is reduced with decreasing R. A simultaneous reduction to a significant extent of both $\Delta I_{DC}$ and $i_{AC}$ is obtained, as can be seen, approximately within the interval $0.1 < \lambda R < 5$ ohm. Which resistance value to choose within this interval depends on the importance attached to a good load division and a low AC component, respectively, and it is, of course, not necessary, as in the example described above, to choose the resistance value (0.8 ohm) that corresponds to the intersection point of the curves.

What is claimed is:

1. Converter apparatus for supplying at least two loads with direct current without requiring large smoothing inductors or special regulating systems for load current distribution comprising:
   at least two converters each having a DC output terminal, each converter operating in phase shifted relation to other converters,
   a load for each converter, each load having an input terminal connected to an output terminal of the corresponding converter, each load having a resistance R and impedance Z,
   the improvement comprising impedance means galvanically interconnecting the input terminals of said loads, said impedance means having a resistance RZ of at least the same order of magnitude as the resistance of said loads, the impedance ZZ of said impedance means having a value at the most the same order of magnitude as the load impedance.

2. The apparatus of claim 1 wherein $RZ > 0.1R$

3. The apparatus of claim 1 wherein $RZ > 0.3R$

4. The apparatus of claim 1 wherein $ZZ < 10Z$.

5. The apparatus of claim 1 wherein $ZZ < 3Z$.

6. The apparatus of claim 1 wherein $RZ > 0.1R$ and $ZZ < 10Z$.

7. The apparatus of claim 1 wherein $RZ > 0.3R$ and $ZZ < 3Z$.

8. The apparatus of claim 1 wherein said impedance means consists of resistors.

9. The apparatus of claim 1, having two converters, wherein said impedance means comprises a resistor connected between said input terminals.